United States Patent
Hanzel et al.

(10) Patent No.: US 7,494,170 B2
(45) Date of Patent: Feb. 24, 2009

(54) VEHICLE INSTRUMENT PANEL HAVING MOVABLE STORAGE COMPARTMENT

(75) Inventors: Andrew J. Hanzel, Washington, MI (US); Joseph W. Cobble, III, Rochester Hills, MI (US); Steven E. Morris, Fair Haven, MI (US); Adrian B. Chernoff, Boulder, CO (US); James T. Embach, Rochester Hills, MI (US); Adrian Oana, Windsor (CA); Frederick I. Johnson, Birmingham, MI (US); Lawrence E. Sully, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/358,733

(22) Filed: Feb. 21, 2006

(65) Prior Publication Data

US 2006/0197353 A1 Sep. 7, 2006

Related U.S. Application Data

(60) Provisional application No. 60/665,107, filed on Feb. 22, 2005.

(51) Int. Cl.
*B60R 7/06* (2006.01)
(52) U.S. Cl. .................... 296/37.12; 296/37.8
(58) Field of Classification Search ............. 296/24.34, 296/37.8, 37.12, 37.13; 312/246, 298, 323, 312/334.7
See application file for complete search history.

(56) References Cited

U.S. PATENT DOCUMENTS

| | | | | | |
|---|---|---|---|---|---|
| 2,301,730 | A | * | 11/1942 | Mann | 312/293.2 |
| 2,657,967 | A | * | 11/1953 | Gilchrist | 312/246 |
| 5,242,223 | A | * | 9/1993 | Koves | 312/348.3 |
| 5,558,385 | A | * | 9/1996 | Gross et al. | 296/37.12 |
| 5,839,553 | A | * | 11/1998 | Dorsam | 190/109 |
| 5,915,776 | A | * | 6/1999 | Bieri | 296/37.12 |
| 5,957,558 | A | * | 9/1999 | Quade | 312/323 |
| 6,042,168 | A | * | 3/2000 | Bieri | 296/37.12 |
| 6,109,493 | A | * | 8/2000 | Bieri | 224/483 |
| 6,830,277 | B2 | * | 12/2004 | Zierle et al. | 296/37.12 |
| 6,854,779 | B2 | * | 2/2005 | Gehring et al. | 296/37.12 |
| 2002/0158448 | A1 | * | 10/2002 | Okonkwo | 280/728.2 |
| 2005/0218681 | A1 | * | 10/2005 | DePue et al. | 296/37.12 |
| 2006/0131913 | A1 | * | 6/2006 | Herterich et al. | 296/37.1 |

FOREIGN PATENT DOCUMENTS

DE 3524222 A1 * 1/1987 ................ 224/483
JP 2003175756 A * 12/2001

* cited by examiner

*Primary Examiner*—Jason S. Morrow

(57) ABSTRACT

An instrument panel for a vehicle defines a cavity. A storage console is selectively movable within the cavity to provide enhanced accessibility of stored items within the storage console. In an exemplary embodiment, the storage console is a drawer that is selectively movable from a stowed position inside the cavity to an extended position outside the cavity for access by a vehicle user in a passenger compartment. In another exemplary embodiment, the console is movable between an elevated position in which the console occupies space inaccessible to a vehicle user, and a lowered position in which the console is accessible through an opening in the instrument panel.

4 Claims, 4 Drawing Sheets

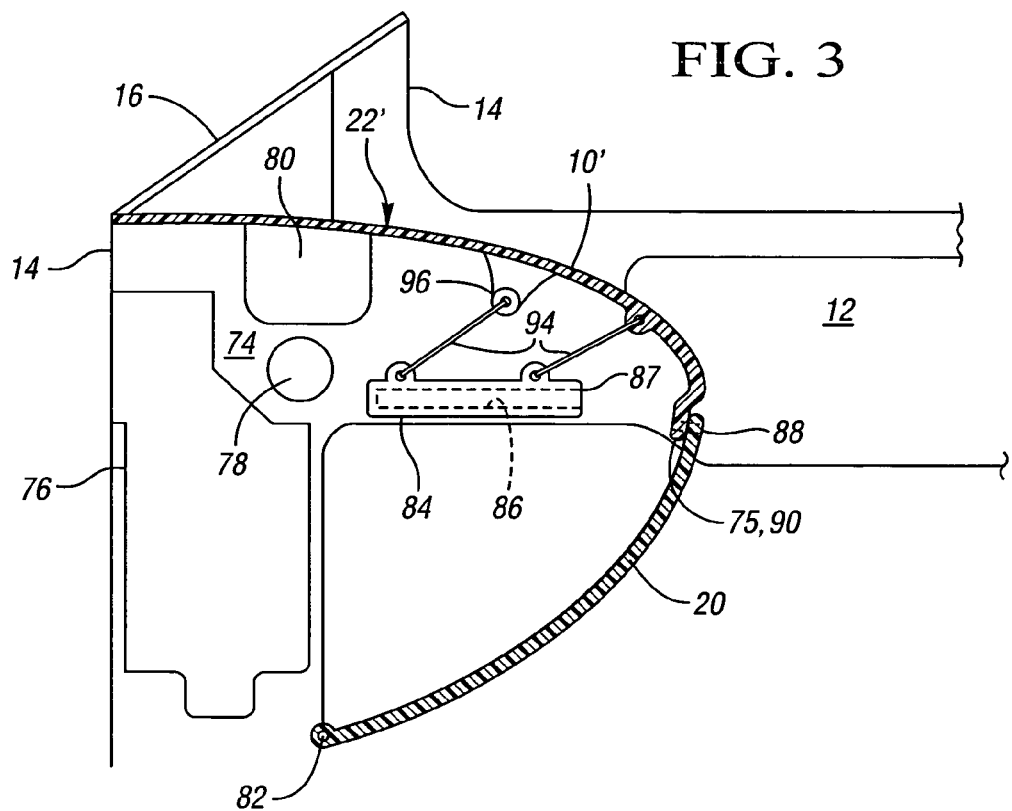
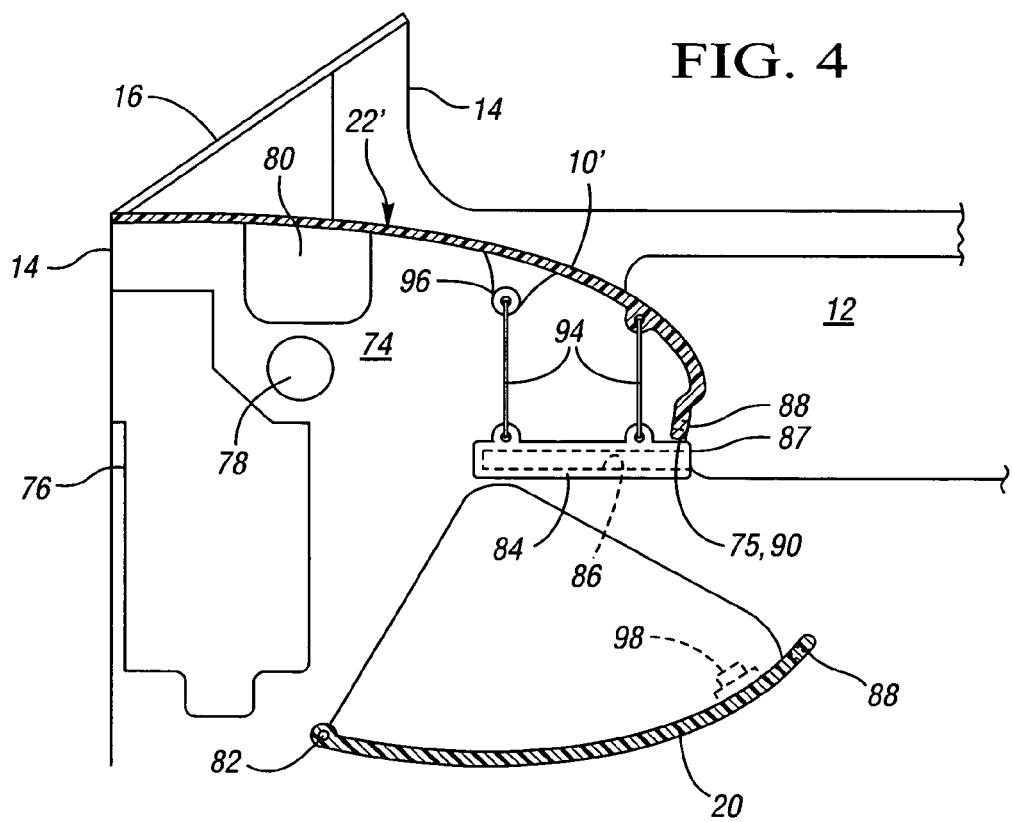

VEHICLE INSTRUMENT PANEL HAVING MOVABLE STORAGE COMPARTMENT

CROSS REFERENCE TO RELATED APPLICATION

This application claims the benefit of U.S. Provisional Patent Application No. 60/665,107, filed Feb. 22, 2005, and which is hereby incorporated by reference in its entirety.

TECHNICAL FIELD

The present invention relates to vehicle instrument panels and dashboards having stowable storage compartments.

BACKGROUND OF THE INVENTION

Prior art vehicles typically include a glove compartment, which is also known as a "glove box." Typically, a glove compartment is in a cavity formed in an instrument panel directly in front of a front passenger seat, and includes a door that is pivotable on hinges between an open and a closed position. A glove compartment is often the primary storage location within the vehicle interior. A glove compartment is often used to store vehicle documents, such as an owners manual or warranty, or legal documentation, such as vehicle registration and proof of insurance.

SUMMARY OF THE INVENTION

A vehicle instrument panel includes structure that defines the exterior surface of the instrument panel and that defines a cavity having an opening formed in the exterior surface of the instrument panel. A console defining a storage compartment is operatively connected to the instrument panel structure, and is selectively movable within the cavity. A movable console defining a storage compartment enables enhanced accessibility by a vehicle user. In an exemplary embodiment, the console is a drawer that is stowable at least partially within the instrument panel cavity, and is selectively movable outside the cavity. When extended outside the cavity, the drawer provides enhanced access to the storage compartment because it is in close proximity to a vehicle driver or passenger and its contents are fully visible and accessible from above.

A movable console defining a storage compartment may also provide improved storage efficiency by using space in the instrument panel that is not readily accessible to a vehicle user. In an exemplary embodiment, the opening to the cavity in the instrument panel is characterized by an upper extent. The console is operatively connected with respect to the instrument panel structure and is selectively movable between a stowed position and an extended position.

In the stowed position, a portion of the console is located within the cavity higher than the upper extent of the opening, and is thus located in a space that is difficult for a vehicle user to access through the opening. The console thus occupies space previously unused in the prior art for personal storage, and provides more room in the cavity for the storage of other items. In the extended position, the portion of the console is located lower than the upper extent of the opening for access by a vehicle user through the opening.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 3 is a schematic, sectional view of an alternative instrument panel configuration including structure defining a cavity, and a storage console shown in a stowed position;

FIG. 4 is a schematic, sectional view of the instrument panel of FIG. 3 with the storage console shown in an extended position;

DESCRIPTION OF THE PREFERRED EMBODIMENTS

Figure 1:
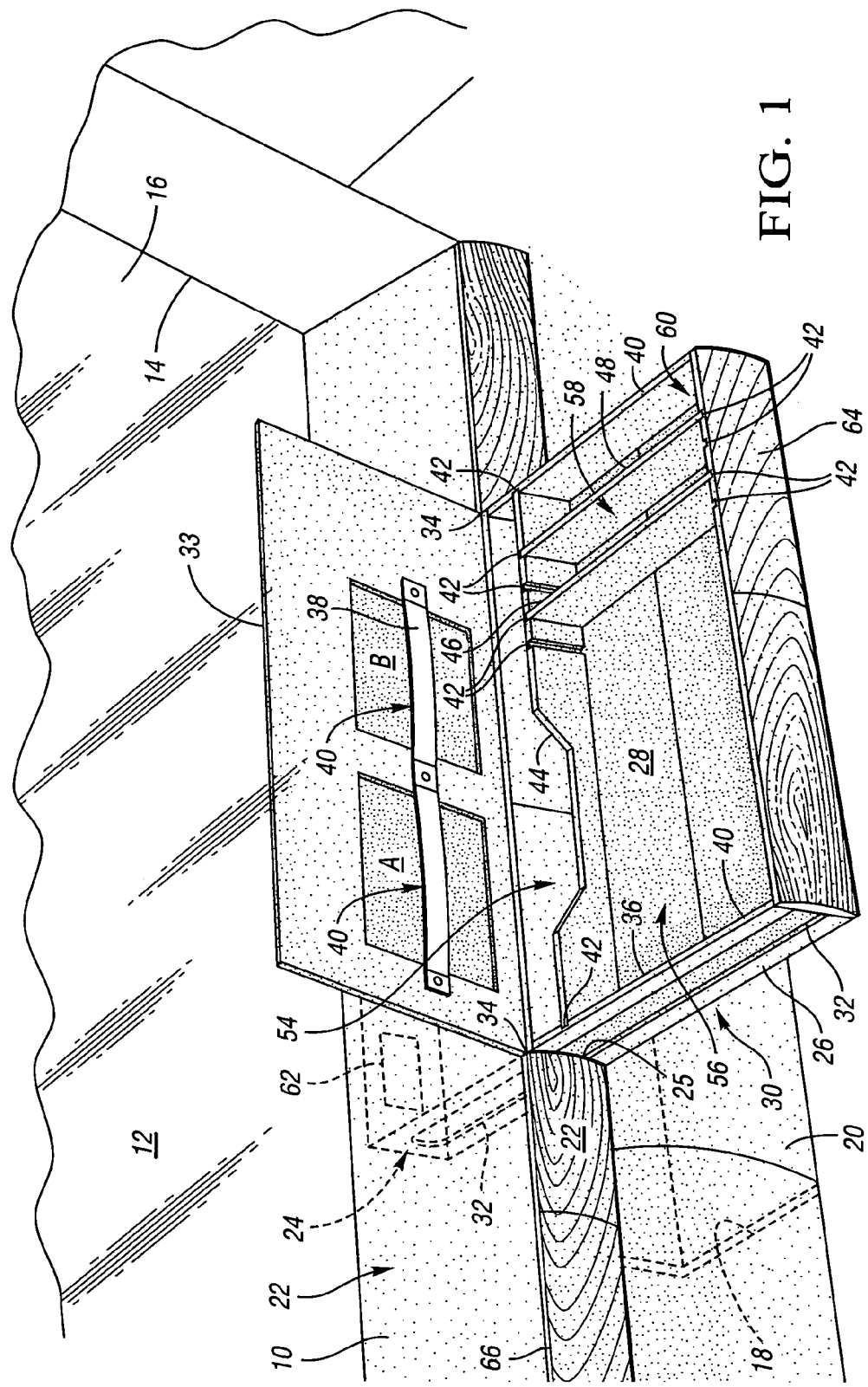
FIG. 1 is a schematic, perspective view an instrument panel including structure defining a cavity, and a storage console shown in an extended position.

Referring to FIG. 1, a vehicle instrument panel 10 is schematically depicted within a vehicle interior compartment 12. The interior compartment 12 is at least partially defined by a vehicle body that includes an A-pillar 14 and a windshield 16. The instrument panel 10 includes structure that defines a cavity 18 that contains a glove compartment 20 or "glovebox," as understood by those skilled in the art. The instrument panel 10 is also characterized by an exterior surface 22 that further defines the vehicle interior compartment 12.

The instrument panel 10 also defines a cavity 24, which is shaped as a slot, above the glove compartment 20. Cavity 24 has an opening 25 formed in the exterior surface 22 of the instrument panel 10. A storage console, i.e., storage drawer 26, defines a drawer cavity, i.e., storage compartment 28. The storage drawer 26 is shown in an extended position in FIG. 1 in which the storage drawer 26 extends through the opening 25 in the instrument panel 10 such that a portion 30 of the storage compartment 28 is outside the cavity 24. In the context of the claimed invention, "a portion" of the storage compartment may include the entire storage compartment or any lesser portion thereof.

The drawer 26 is operatively connected to the structure of the instrument panel 10 through a complementary track system 32 commonly located on the drawer 26 and the instrument panel 10. The track system 32 is configured so that the drawer 26 is selectively slidable in and out of the cavity 24 in the instrument panel 10 through opening 25. In the embodiment depicted, the track system 32 is generally linear so that movement of the drawer 26 is substantially restricted to linear translation forward and rearward with respect to the vehicle body, and in and out of the cavity 24.

Those skilled in the art will recognize other methods of operatively connecting the drawer 26 to the instrument panel 10 that may be employed within the scope of the claimed invention. For example, the track 32 may be on the bottom of the drawer 26 rather than on the side of the drawer 26 as shown in FIG. 1. Alternatively, the drawer may be attached to the instrument panel without a track within the scope of the claimed invention. For example, the structure of the instrument panel 10 that defines cavity 24 may directly contact the drawer and support the drawer in the instrument panel.

In the embodiment depicted, the drawer 26 has a door 33, which is pivotably secured to the drawer 26 at the forward end 34 of the drawer 26 via hinges (not shown) so that the storage compartment 28 is selectively accessible to vehicle passengers. The storage compartment 28 is upwardly open, or open in the vertical direction, through opening 36. The door 33 is selectively pivotable between an open position as shown in FIG. 1 wherein the door 33 does not obstruct the opening 36, and a closed position in which the door 33 covers the storage compartment 28 and obstructs the opening 36.

A strip 38 is connected to the door 33; the strip 38 and the door 33 cooperate to define slits 40 therebetween. The slits 40 are sufficiently sized to hold documentation such as proof of vehicle insurance and/or vehicle registration, shown as A and B respectively in FIG. 1.

The drawer 26 defines slots 42 around its perimeter to receive space dividers 44, 46, 48. The space dividers 44, 46, 48 are operative to divide the storage compartment 28 into subcompartments. Space divider 44 is equipped with slots 42 to accommodate other space dividers 46, 48. Subcompartment 54 is defined by the storage drawer 26 and the first space divider 44. Subcompartment 56 is defined by the storage drawer 26 and space dividers 44, 46. Subcompartment 58 is defined by the storage drawer 26 and space dividers 44, 46, 48. Subcompartment 60 is defined by the storage drawer 26 and space dividers 44, 48.

Figure 2:
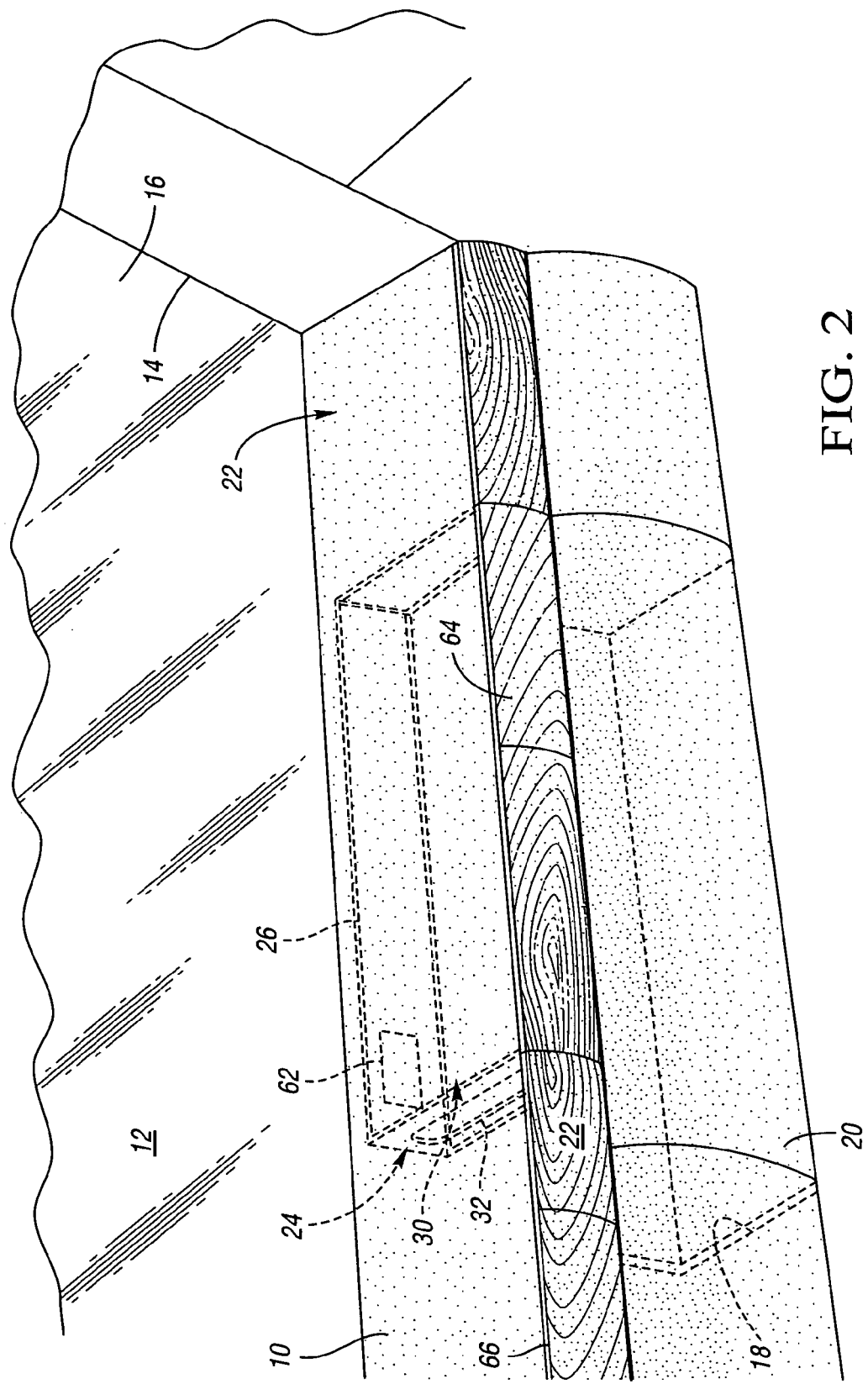
FIG. 2 is a schematic, perspective view of the instrument panel of FIG. 1 with the storage console in a stowed position.

When the drawer 26 is in the extended position shown in FIG. 1, and when the door 33 is open as shown, the storage compartment is readily accessible and fully viewable to a passenger in a passenger seat (not shown) directly rearward of the drawer 26. The drawer 26 is selectively translatable forward in the vehicle body from the extended position, in which portion 30 of the storage compartment 28 is outside cavity 24, to a stowed position as shown in FIG. 2. Referring to FIG. 2, wherein like reference numbers refer to like components from FIG. 1, the portion of the storage compartment shown at 30 in FIG. 1 is inside the cavity (shown at 24 in FIG. 1). In the embodiment depicted, substantially the entire storage compartment is located in the cavity to maximize free space in the portion of the interior compartment 12 near the passenger seat (not shown).

In one embodiment, the storage drawer 26 and instrument panel 10 are configured with a spring-biased lock 62 so that upon applying pressure to the face 64 of the storage drawer 26 the drawer is released from the lock 62 and able to slide in and out of the instrument panel 10. To secure the drawer 26 within the instrument panel 10 pressure is reapplied to the face 64 of the drawer and the drawer 26 is thereby secured in place.

In the preferred embodiment, a decorative trim piece 66, which protrudes from the instrument panel 10 and continues across the face 64 of the storage drawer 26, is provided. Therefore the storage drawer 26 aesthetically blends in with the instrument panel 10 when stowed therein. The face 64 of the drawer 26 is preferably flush with the trim piece 66 when the drawer is in the stowed position.

Referring to FIG. 3, wherein like reference numbers refer to like components from FIGS. 1 and 2, an alternative instrument panel 10' is schematically depicted. The instrument panel 10' defines an instrument panel cavity 74. Inside the cavity 74 is part of a thermal control device 76 or heating, ventilating and air conditioning system (HVAC). Above the thermal control device 76 is a structural member 78. A passenger-side air bag 80 is selectively deployable through the upper portion of the exterior surface 22' of the instrument panel, as understood by those skilled in the art. Adjacent the HVAC 76 is a glove compartment 20, which is pivotably connected to the instrument panel at 82. A console, i.e., storage bin 84, is located within the cavity 74. The storage bin 84 defines a storage compartment 86 characterized by a rearward-facing opening 87.

The cavity 74 is characterized by an opening 75 in the exterior surface 22' of the instrument panel 10'. The glove compartment 20 is pivotable about 82 between a closed position as shown in FIG. 3, and an open position as shown in FIG. 4. In the closed position, the door portion of the glove compartment 20 obstructs the opening 75 to the cavity 74. Complementary latching mechanisms 88 are disposed on the glove compartment 20 and the instrument panel 10 to releasably secure the glove compartment in the closed position. When the complementary latching mechanisms 88 are released or disengaged, the glove compartment 20 is pivotable to the open position, in which at least a portion of the opening 75 is unobstructed.

The opening 75 is characterized by an uppermost extent 90. The storage bin 84 is movably connected with respect to the structure of the instrument panel 10' and is selectively movable between a stowed position, as shown in FIG. 3, in which a portion of the storage bin 84 is located within the cavity higher than the upper extent of the opening, and an extended position, as shown in FIG. 4, in which the portion of the storage bin 84 is located lower than the upper extent 90 of the opening 75 for access by a vehicle user. In the embodiment depicted, the storage bin 84 is movably secured to the instrument panel 10' by a four-bar linkage 94, which is configured to selectively swing the bin downward and rearward in a curvilinear motion.

Those of ordinary skill in the art will recognize a variety of mechanisms that may be employed within the scope of the claimed invention to operatively connect the bin 84 to the instrument panel 10' and to control or restrict the movement of the bin between the stowed and extended positions. For example, the bin 84 may be operatively connected to the instrument panel 10' via a track that restricts the movement of the bin 84 relative to the instrument panel 10' to linear translation between a stowed position and an extended position.

In an exemplary embodiment, the instrument panel 10' is configured so that the storage bin 84 automatically moves to the extended position when the glove compartment 20 is open and to the stowed position when the glove compartment 20 is closed. For example, a sensor (not shown) may monitor the position of the glove compartment, and communicate with an actuator 96, which causes the linkage 94 to rotate when the glove compartment pivots about 82. Alternatively, the glove compartment or instrument panel 10' can have a depressible button 98 (or switch) that actuates the linkage 94 and swings the bin 70 to the extended position. Alternatively, the bin 84 may be moved downward by springs or gravity, and dampeners (not shown) may be employed with linkage 94. Alternatively, the storage bin 84 may be attached to the glove compartment 20 and configured to deploy under similar conditions to those detailed above. The storage compartment 86 is preferably sufficiently sized to contain a vehicle owner's manual.

Figure 5:
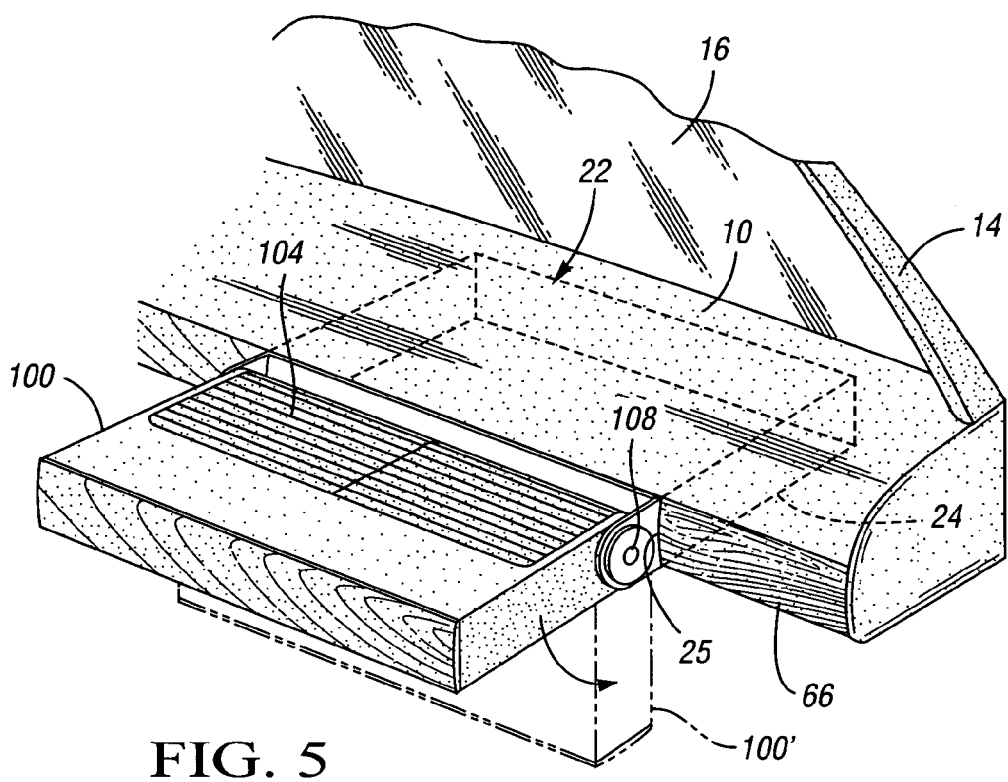
FIG. 5 is a schematic, perspective view of the instrument panel of FIGS. 1 and 2 with an alternative drawer configuration.

Referring to FIG. 5, wherein like reference numbers refer to like components from FIGS. 1-4, an alternative drawer 100 is schematically depicted. The drawer 100 is selectively movable between a stowed position (not shown) and an extended position, as shown in FIG. 5. In the stowed position, the drawer 100, including a storage compartment (shown at 28' in FIG. 6), is substantially entirely within the slot 24 formed in the instrument panel 10. The drawer is movable, through linear translation, from the stowed position to the extended position shown in which the drawer 100 is rearward of the stowed position and substantially entirely outside of the slot 24. The drawer 100 includes a tambour door 104 to selectively close an opening to the storage compartment.

The instrument panel 10 includes member 108, which is connected to the structure of the instrument panel 10 such as via a track (as shown at 32 in FIG. 1) for movement with the drawer 100 from the stowed to the extended position. The drawer 100 is pivotable mounted with respect to the member 108 such that the drawer is pivotable or rotatable from the extended position to a third position shown at 100'.

Figure 6:
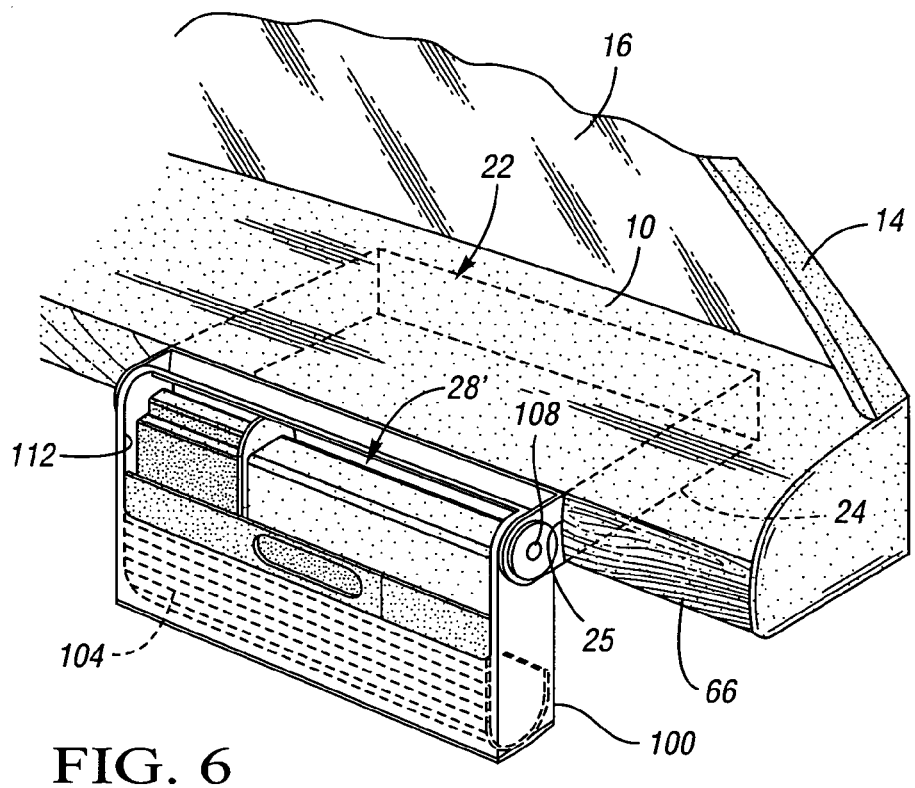
FIG. 6 is another schematic, perspective view of the instrument panel and alternative drawer configuration of FIG. 5.

Referring to FIG. 6, the door 100 is shown in the third position, and the tambour door 104 is open to provide access to the storage compartment 28' through opening 112. An owners manual and other documentation is shown in the storage compartment 28'. In an alternative embodiment (not shown), the drawer 100 may be configured with an accordion-style expandable folder.

An instrument panel may define a wet item storage chamber (not shown) having apertures or holes in the lower surface of the chamber to allow for fluids (like water) to pass through. The chamber may be positioned directly rearward of a vent (not shown) such that air from vent passes through the chamber before entering the passenger compartment. The vent, and correspondingly the chamber, is in air flow communication with the heating, ventilating and air conditioning system (not shown). Warm air from the heating, ventilating and air conditioning system can assist in accelerating the evaporation of any water or other liquids from items stored within the chamber, such as gloves, small umbrellas, and/or sunglasses.

While the best modes for carrying out the invention have been described in detail, those familiar with the art to which this invention relates will recognize various alternative designs and embodiments for practicing the invention within the scope of the appended claims.

The invention claimed is:

1. A vehicle instrument panel comprising:
   structure defining the exterior surface of the instrument panel and a cavity having an opening formed in the exterior surface of the instrument panel, wherein said opening is characterized by an upper extent; and
   a console defining a storage compartment, the console being selectively movable within the cavity, wherein said console is movably connected with respect to the structure and selectively movable between a stowed position in which a portion of the storage compartment is located within the cavity higher than the upper extent of the opening, and an extended position in which the portion of the storage compartment is located lower than the upper extent of the opening for access by a vehicle user.

2. The vehicle instrument panel of claim 1, further comprising a glovebox below said console and having a door; said door being operatively connected to said structure for movement between a closed position in which the door obstructs the opening, and an open position.

3. The vehicle instrument panel of claim 1, further comprising at least one mechanical linkage operatively interconnecting the console and the structure.

4. A vehicle instrument panel comprising:
   instrument panel structure defining the exterior surface of the instrument panel and a cavity characterized by an opening formed in the exterior surface of the instrument panel, said opening being characterized by an uppermost extent;
   a glove compartment being at least partially located within the cavity and including a door that is selectively movable between a closed position in which the door obstructs the opening and an open position in which at least a portion of the opening is unobstructed; and
   a storage console defining a storage compartment and being operatively connected to the instrument panel structure for movement between an elevated position in which a portion of the storage console is inside the cavity and higher than the uppermost extent of the opening, and a lowered position in which the portion of the storage console is lower than the uppermost extent of the opening.

* * * * *